Sept. 27, 1932.  H. O. JACOBSON  1,880,094

SHAFT COUPLING

Filed March 3, 1932

Inventor:
Herbert O. Jacobson,
by Charles J. Gooding, Atty.

Patented Sept. 27, 1932

1,880,094

UNITED STATES PATENT OFFICE

HERBERT O. JACOBSON, OF EVERETT, MASSACHUSETTS

SHAFT COUPLING

Application filed March 3, 1932. Serial No. 596,485.

This invention relates to an improved shaft coupling for coupling together a driving and a driven shaft. The coupling is of that class in which a driving member is fastened to one end of the driving shaft and a driven member is fastened to the adjacent end of the driven shaft, and each of said members have lugs spaced apart projecting from the adjacent ends, the lugs on the driving member projecting between the lugs on the driven member, and spiral springs are interposed between the lugs on the driving and driven members respectively. When the driving member starts to drive the driven member, the driven member being under a state of rest, the spiral springs between the lugs on the driving and driven members are compressed and thus the shock of starting the driven member by the driving member is absorbed. After the driven member has been caused to rotate until it is rotating at the same speed as the driving member, then the amount of energy necessary to continue the driving of the driven member is reduced, and consequently the pressure on said springs is reduced and the springs expand leaving a considerable space between the lugs of the driving member and the adjacent lugs of the driven member. Under these conditions when a brake is applied to the driven member to stop it, the driving member continues its forward movement compressing the spring and causing its lugs to abut with great violence against the lugs on the driven member, and this action causes breakage and damage to the shaft coupling.

The object of the present invention is to overcome these defects in a shaft coupling of the character described.

To these ends the invention consists in a shaft coupling of the character hereinafter described in the specification and particularly pointed out in the claims.

Referring to the drawing:—

Like numerals refer to like parts in the several views of the drawing.

Figure 1:
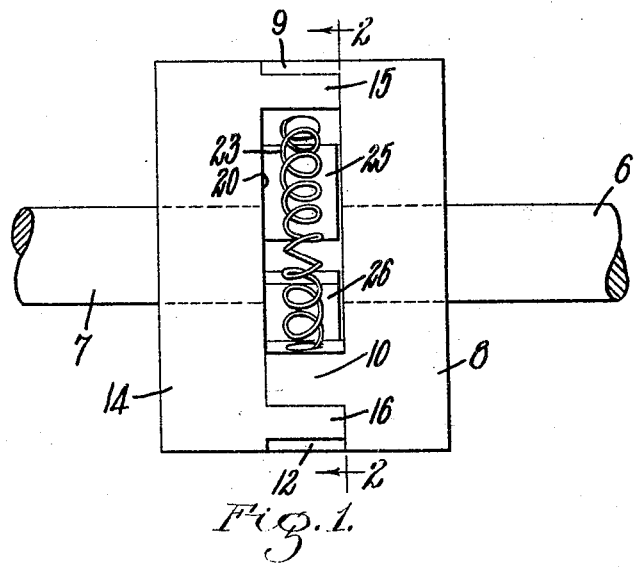
Fig. 1 is a front elevation of a shaft coupling embodying my invention.

In the drawing, 6 is a driving shaft and 7 a driven shaft. A driving member 8 is fastened to the driving shaft 6 and is preferably cylindrical in form with lugs 9, 10, 12 and 13 projecting from one end thereof, namely, the end which is adjacent to the driven member 14, which is preferably also cylindrical in form and has lugs 15, 16, 17 and 18 projecting from the end face which is adjacent to the driving member 8.

The lugs of the driving member are spaced apart from each other and the lugs of the driven member are spaced apart from each other, the lugs of the driving member projecting into the spaces between the lugs of the driven member as at 19, 20, 21 and 22. A spiral spring 23 is interposed between the lug 10 of the driving member and the lug 15 of the driven member, the ends of said spring entering recesses in said lugs. Another spiral spring 24 is interposed between the lug 13 of the driving member and the lug 17 of the driven member, its opposite ends entering recesses provided in said lugs.

Dogs 25 and 26 are fastened to pins 27 and 28 which constitute pivots and extend through the driven member 14. These dogs are fastened to the inner ends of the pins 27 and 28 and said pins each have formed thereon at their outer ends an arm 29 positioned in a recess 30, and a spiral spring 31 bears against each of said arms 29 at one end and against a plug 32 in the driven member at the other end.

Figure 2:
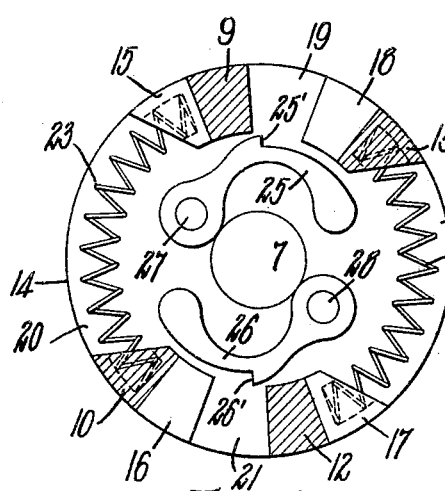
Fig. 2 is an end elevation of the driven member as viewed from the right of Fig. 1, the lugs of the driving member being shown in connection therewith in section, as taken on the line 2—2, Fig. 1, the parts being shown in the relative positions assumed thereby when the shaft coupling is stationary.

The general operation of the clutch hereinbefore specifically described is as follows:—
Assuming the driving shaft to be rotating in a clockwise direction as viewed in Figs. 2 and 3, it will be seen that the lug 10 will press against the spiral spring 23 which in its turn presses against the lug 15 on the driven member 14 and at the same time the lug 13 will press against the spring 24 which in its turn will press against the lug 17 on the driven member.

Due to the inertia of the driven member, a certain amount of compression will take place in the springs 23 and 24, thus cushioning the starting movement of the driving and driven members. At first this compression of the springs 23 and 24 will cause the driving and driven members to assume the relative positions illustrated in Fig. 3, the springs 23 and 24 having been compressed sufficiently so that the lug 9 on the driving member bears against the lug 18 on the driven member and the lug 12 on the driving member bears against the lug 16 on the driven member.

Figure 3:
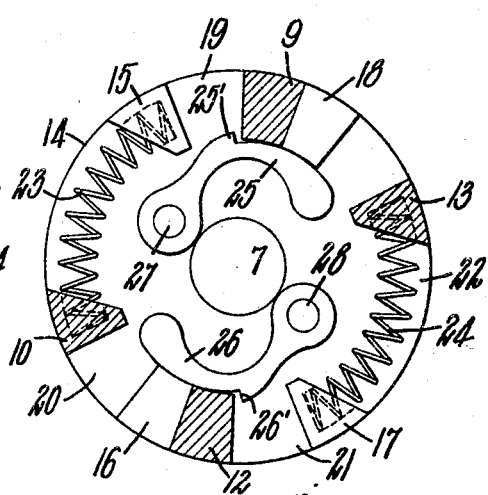
Fig. 3 is an end elevation partly in section similar to Fig. 2 except that the parts are shown in the relative positions when the driving member is locked against movement relatively to the driven member.
Figure 4:
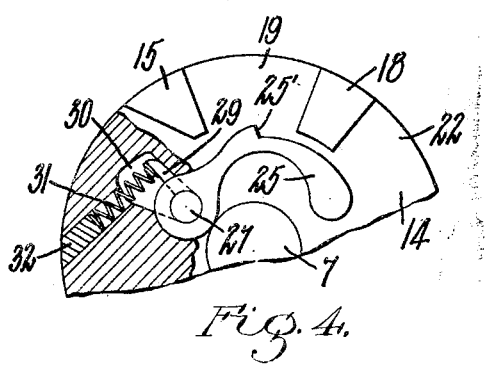
Fig. 4 is a detail sectional elevation illustrating the means whereby the locking dog is spring actuated.
Figure 5:
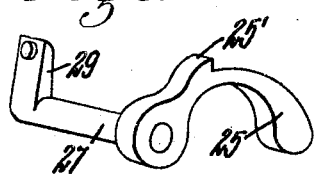
Fig. 5 is a perspective view of the locking dog.

The driving and driven members are now rotating at the same speed and the high speed of the driven member causes the dogs 25 and 26 to be thrown outwardly by centrifugal force against the action of their springs 31 until they assume the relative positions illustrated in Fig. 3.

The dog 25 has a tooth 25′ on its outer edge and the dog 26 has a tooth 26′ on its outer edge, and these teeth, in the new position assumed by the dogs 25 and 26, project into the space back of the driving member lugs 9 and 12 and thus the driving and driven members are locked together so that the driving member lug 9 can move away from the driven member lug 18 and the driving member lug 12 can move away from the driven member lug 16 only to a very slight extent when they will engage the teeth 25′ and 26′ respectively of the dogs 25 and 26.

The parts retain the relative positions illustrated in Fig. 3 until a brake is applied to the driven member and the switch of the motor which drives the driving member is operated, whereupon the driven member stops its rotation and the lug 9 of the driving member being held in contact with the lug 18 of the driven member and the lug 12 of the driving member being held in contact with the lug 16 of the driven member by the momentum of the driving member, it follows that the rotation of the driving shaft and the driving member 14 will be stopped. At this time the centrifugal force which causes the dogs 25 and 26 to be thrown outwardly from the positions illustrated in Fig. 2 to the positions illustrated in Fig. 3 ceases, and the dogs 25 and 26 will be moved inwardly by their springs 31 to the positions illustrated in Fig. 2 and then the springs 23 and 24 will be allowed to expand until the ears 10 and 13 of the driving member engage the ears 16 and 18 of the driven member.

Thus the shock which occurred in the old style coupling, due to the springs having been expanded during the rotation of the driving and driven member and the lugs of the driving and driven members having been separated from each other before the driven member was stopped, whereby when the driven member was stopped the driving member continued its forward motion until its lugs engaged the lugs of the driven member with great force, has been done away with.

I claim:

1. A shaft coupling having, in combination, a driving member and a driven member, lugs on the adjacent ends of each of said members projecting into the spaces between the lugs of the other of said members, a spring interposed between two of said lugs, means to lock said members against the movement of said last-named lugs away from each other by said spring, and means to return said locking means to its normal position and unlock said members to allow said lugs to move away from each other when said members are prevented from rotating.

2. A shaft coupling having, in combination, a driving member and a driven member, lugs on the adjacent ends of each of said members projecting into the spaces between the lugs of the other of said members, a spring interposed between two of said lugs, means operated by centrifugal force to lock said members against the movement of said last-named lugs away from each other by said spring, and means to return said locking means to its normal position and unlock said members to allow said lugs to move away from each other when said members are prevented from rotating.

3. A shaft coupling having, in combination, a driving member and a driven member, lugs on the adjacent ends of each of said members projecting into the spaces between the lugs of the other of said members, a spring interposed between two of said lugs, means mounted on one of said members and adapted to be operated by centrifugal force to engage a lug on the other of said members to lock said members against the movement of said lugs away from each other by said spring, and means to return said locking means to its normal position and unlock said members to allow said lugs to move away from each other when said members are prevented from rotating.

4. A shaft coupling having, in combination, a driving member and a driven member, lugs on the adjacent ends of each of said members projecting into the spaces between the lugs of the other of said members, a spring interposed between two of said lugs, means pivotally mounted on one of said members and adapted to be operated by centrifugal force to engage one of the lugs on the other of said members to lock said members against the movement of said last-named lugs away from each other by said spring, and means to return said locking means to its normal position and unlock said members to allow said lugs to move away from each other when said members are prevented from rotating.

5. A shaft coupling having, in combination, a driving member and a driven member, lugs on the adjacent ends of each of said members projecting into the spaces between the lugs of the other of said members, a spring interposed between two of said lugs, means pivotally mounted on one of said members and adapted to be operated by centrifugal force to engage one of the lugs on the other of said members to lock said members against the movement of said last-named lugs away from each other by said spring, and a spring adapted to move said pivotally mounted means out of locking engagement with said lug.

6. A shaft coupling having, in combination, a driving member and a driven member, lugs on the adjacent ends of each of said members projecting into the spaces between the lugs of the other of said members, a spring interposed between two of said lugs, a dog pivotally mounted on one of said members and adapted to be operated by centrifugal force to engage one of the lugs on the other of said members to lock said members against the movement of said lugs away from each other by said springs, and means to return said dog to its normal position and unlock said members to allow said lugs to move away from each other when said members are prevented from rotating.

7. A shaft coupling having, in combination, a driving member and a driven member, lugs on the adjacent ends of each of said members projecting into the spaces between the lugs of the other of said members, a spring interposed between two of said lugs, a dog pivotally mounted on one of said members and adapted to be operated by centrifugal force to engage one of the lugs on the other of said members to lock said members against the movement of said lugs away from each other by said spring, and a spring adapted to move said dog out of locking engagement with said lug.

8. A shaft coupling having, in combination, a driving member and a driven member, lugs on the adjacent ends of each of said members projecting into the spaces between the lugs of the other of said members, a spring interposed between two of said lugs, a dog pivotally mounted on said driven member and adapted to be operated by centrifugal force to engage one of the lugs on said driving member to lock said members against the movement of said last-named lugs away from each other by said spring, and means to return said dog to its normal position and unlock said members to allow said lugs to move away from each other when said members are prevented from rotating.

9. A shaft coupling having, in combination, a driving member and a driven member, lugs on the adjacent ends of each of said members projecting into the spaces between the lugs of the other of said members, a spring interposed between two of said lugs, a dog pivotally mounted on said driven member and adapted to be operated by centrifugal force to engage one of the lugs on said driving member to lock said members against the movement of said last-named lugs away from each other by said spring, and a spring adapted to move said dog out of locking engagement with said driving member lug.

10. A shaft coupling having, in combination, a driving member and a driven member, lugs on the adjacent ends of each of said members projecting into the spaces between the lugs of the other of said members, a spring interposed between two of said lugs, a dog with a tooth in its outer edge and pivotally mounted on said driven member and adapted to be operated by centrifugal force to cause said tooth to engage one of the lugs on said driving member to lock said members against the movement of said last-named lugs away from each other by said spring, and means to return said dog to its normal position and unlock said members to allow said lugs to move away from each other when said members are prevented from rotating.

11. A shaft coupling having, in combination, a driving member and a driven member, lugs on the adjacent ends of each of said members projecting into the spaces between the lugs of the other of said members, a spring interposed between two of said lugs, a dog with a tooth in its outer edge and pivotally mounted on said driven member and adapted to be operated by centrifugal force to cause said tooth to engage one of the lugs on said driving member to lock said members against the movement of said last-named lugs away from each other by said spring, and a spring adapted to move said dog out of locking engagement with said driving member lug.

12. A shaft coupling having, in combination, a driving member and a driven member, lugs on the adjacent ends of each of said members projecting into the spaces between the lugs of the other of said members, a spring interposed between a lug on the driving member and a lug on the driven member, a lug on the driving member when in advanced position being adapted to contact with a lug on the driven member, means to lock said members against the movement of said last-named lugs away from each other by said spring, and means to return said locking means to its normal position and unlock said members to allow said lugs to move away from each other when said members are prevented from rotating.

13. A shaft coupling having, in combination, a driving member and a driven member, lugs on the adjacent ends of each of said members projecting into the spaces between the lugs of the other of said members, a spring interposed between a lug on the driving member and a lug on the driven member, a lug on the driving member when in advanced position being adapted to contact with a lug on the driven member, means operated by centrifugal force to lock said members against the movement of said last-named lugs away from each other by said spring, and means to return said locking means to its normal position and unlock said members to allow said lugs to move away from each other when said members are prevented from rotating.

14. A shaft coupling having, in combination, a driving member and a driven member, lugs on the adjacent ends of each of said members projecting into the spaces between the lugs of the other of said members, a spring interposed between a lug on the driving member and a lug on the driven member, a lug on the driving member when in advanced position being adapted to contact with a lug on the driven member, means mounted on one of said members and adapted to be operated by centrifugal force to engage a lug on the other of said members to lock said members against the movement of said lugs away from each other by said spring, and means to return said locking means to its normal position and unlock said members to allow said lugs to move away from each other when said members are prevented from rotating.

15. A shaft coupling having, in combination, a driving member and a driven member, a projection on one of said members projecting into a space in the other of said members, a spring interposed between said projection and one end of said space, means to lock said members against the movement by said spring of said projection relatively to said other member when the said projection is in an advanced position, and means to return said locking means to its normal position and unlock said members to allow said projection to be moved by said spring relatively to said other member when said members are prevented from rotating.

16. A shaft coupling having, in combination, a driving member and a driven member, a projection on one of said members projecting into a space in the other of said members, a spring interposed between said projection and one end of said space, means operated by centrifugal force to lock said members against the movement by said spring of said projection relatively to said other member when the said projection is in an advanced position, and means to return said locking means to its normal position and unlock said members to allow said projection to be moved by said spring relatively to said other member when said members are prevented from rotating.

In testimony whereof I have hereunto set my hand.

HERBERT O. JACOBSON.